(12) United States Patent
Oh

(10) Patent No.: US 7,880,835 B2
(45) Date of Patent: Feb. 1, 2011

(54) LIQUID CRYSTAL DISPLAY PANEL

(75) Inventor: Dongki Oh, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 139 days.

(21) Appl. No.: 12/125,415

(22) Filed: May 22, 2008

(65) Prior Publication Data

US 2009/0079914 A1 Mar. 26, 2009

(30) Foreign Application Priority Data

Sep. 26, 2007 (CN) .................... 2007 1 0122513

(51) Int. Cl.
*G02F 1/1333* (2006.01)
(52) U.S. Cl. ...................... 349/110; 349/111
(58) Field of Classification Search .......... 349/110–111
See application file for complete search history.

(56) References Cited

U.S. PATENT DOCUMENTS 7,265,809 B2 * 9/2007 Dunn et al. ................ 349/161
7,379,145 B2 * 5/2008 Chung ....................... 349/141
2009/0079914 A1 * 3/2009 Oh ............................. 349/106

\* cited by examiner

*Primary Examiner*—David Nelms
*Assistant Examiner*—Phu Vu
(74) *Attorney, Agent, or Firm*—Ladas & Parry LLP

(57) ABSTRACT

A liquid crystal display (LCD) panel, comprising an array substrate and a color filter substrate, the array substrate comprises a first substrate, shielding bars, gate lines, data lines, and pixel electrodes, the color filter substrate comprises a second substrate, wherein the array substrate and color filter substrate are divided into at least a left side region and a right side region; a plurality of first BMs are provided on the second substrate in the left side region of the color filter substrate, with respect to a central line of the data line corresponding to each of the first BMs, a length of a right side portion is longer than that of a left side portion for each of the first BMs; a plurality of second BMs are provided on the second substrate in the right side region of the color filter substrate, with respect to a central line of the data line corresponding to each of the second BMs, a length of a left side portion is longer than that of a right side portion for each of the second BMs. In the LCD panel of the present invention, the length of a side of the BM on the second substrate in different regions of the color filter substrate is increased to increase the critical dimension, so that the occurrence of light leakage can be effectively avoided when the LCD panel is flapped.

7 Claims, 2 Drawing Sheets

LIQUID CRYSTAL DISPLAY PANEL

BACKGROUND

The present invention relates to a liquid crystal display panel, and particularly, to a liquid crystal display panel capable of reducing light leakage.

A liquid crystal display (LCD) panel comprising an array substrate and a color filter substrate is the core component of a LCD. The design of the color filter substrate varies according to the type of the LCD. The LCD panel fabricated by liquid crystal filling (LC filling) is uniform in structure and favorable for production, but it is difficultly applicable to a glass substrate of a large size.

As shown in FIG. 1, the array substrate comprises a first glass substrate 100, on which there are provided shielding bars 101, gate lines (not shown), data lines 102, and pixel electrodes 103, and the color filter substrate comprises a second glass substrate 200, on which there are provided a black matrix (BM) 201, a color resin layer (now shown), and a photo spacer (PS) layer (not shown). The PS layer is capable of maintaining a uniform liquid crystal cell gap across the panel and thus is applicable to a glass substrate of a large size. However, since the elasticity of the PS layer is limited, when the LCD panel is flapped, the alignment between the color filter substrate and the array substrate can be distorted, and light leakage occurs, as shown in FIG. 2. When the LCD panel is flapped from the left side, the color filter substrate shifts to the right side, and the array substrate shifts to the left side. On the other hand, when the LCD panel is flapped from the right side, the color filter substrate shifts to the left side, and the array substrate shifts to the right side. The color filter substrate and the array substrate can not return to the original position by themselves after the above-mentioned shift, thus resulting in light leakage.

To solve the above problems, methods like the color filter design and the liquid crystal over-filling are used in the conventional technology, for example, the length of BM is increased at its both sides to improve the assembly margin. However, these methods can not completely solve the above problems.

SUMMARY

In an embodiment of the present invention, there is provided a LCD panel. The LCD panel comprises an array substrate and a color filter substrate, the array substrate comprising a first substrate and shielding bars, gate lines, data lines, and pixel electrodes that are formed on the first substrate, and the color filter substrate comprising a second substrate. The array substrate and color filter substrate are divided into at least a left side region and a right side region; a plurality of first black matrixes (BMs) are provided in the left side region on the second substrate of the color filter substrate, and with respect to a central line of the data line corresponding to each of the first BMs, a length of a right side portion is longer than that of a left side portion for each of the first BMs; and a plurality of second BMs are provided in the right side region on the second substrate of the color filter substrate, and with respect to a central line of the data line corresponding to each of the second BMs, a length of a left side portion is longer than that of a right side portion for each of the second BMs.

In the LCD panel according to the above embodiment of the invention, the length from a side of the BM on the second substrate in different regions of the color filter substrate is increased to increase the critical dimension, so that the occurrence of light leakage can be avoided when the LCD panel is flapped. The decrease of the aperture ratio in the LCD panel according to the present invention can be minimized as well, as compared with the conventional technology in which the lengths of both sides of the BM are increased to increase the critical dimension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereinafter with reference to the accompanying drawings. However, the present can be realized in different ways and should not be limited to the embodiments set forth hereinafter. It should be understood by those skilled in the art that in this description when a layer or a element is referred to as being "on" or "connected to" another layer or element, this layer or element can be directly on or directly connected to the other layer or element, or an intervening layer may also be present therebetween.

Figure 1:
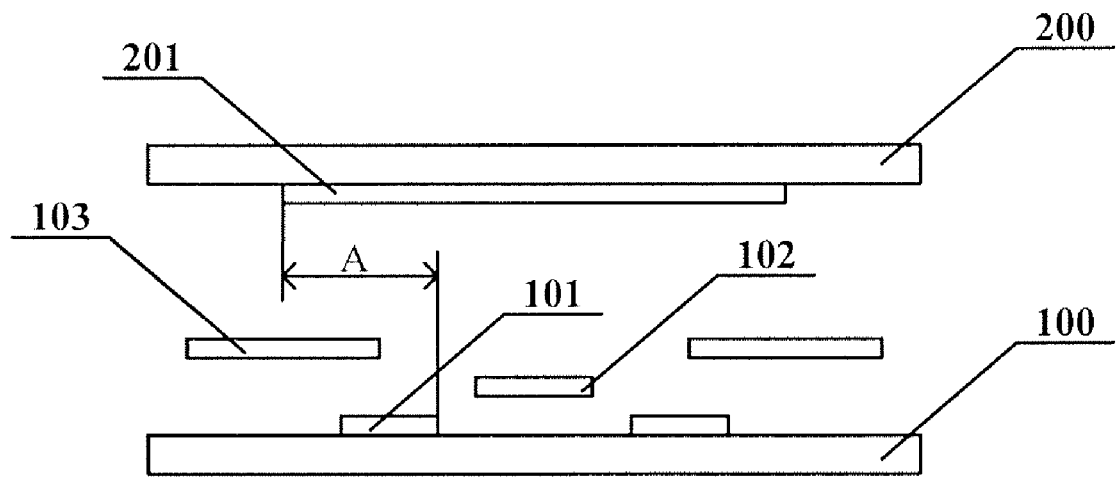
FIG. 1 is a structural view showing a LCD panel in the conventional technology.
Figure 2:
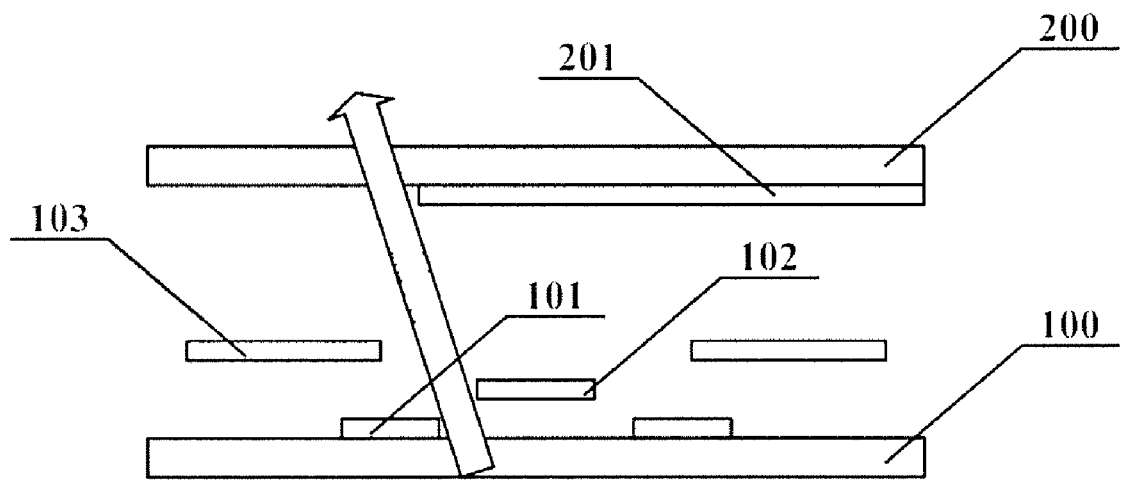
FIG. 2 is a diagram showing the occurrence of light leakage when the LCD panel is flapped in the conventional technology.

During the manufacturing of a LCD, the assembling accuracy between an array substrate and a color filter substrate in vacuum imposes a substantial effect on the optical property of a finished LCD panel. That is, an assembly margin is an important parameter during the manufacturing of a LCD panel. The assembly margin A is defined to be a sum of a width of a shielding bar and a distance from the outer side of the shielding bar to the outer side of a black matrix (BM) (see FIG. 1). When assembly deviation approaches or exceeds the assembly margin, light leakage will occur, in which case the display quality of the finished LCD panel may be disadvantageously affected and the brightness and contrast in a dark state for the LCD panel may be greatly reduced.

In a LCD panel according to an embodiment of the present invention, the assembly margin is increased, i.e., the critical dimension (CD) of the BM is increased, so as to suppress the occurrence of light leakage when the LCD panel is flapped. The increase of the CD of the BM results in reducing the aperture ratio of the panel. Therefore, in the embodiment of the present invention, the length from only one side of the BM is increased so as to increase the CD, and the decrease of the aperture ratio can be minimized.

Figure 3:
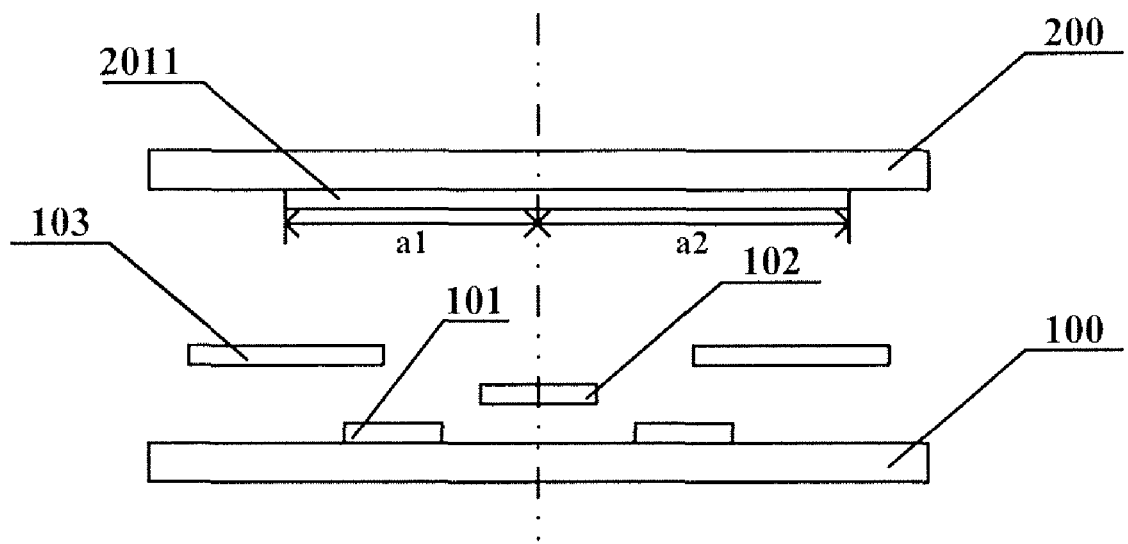
FIG. 3 is a structural view showing a left side region of a LCD panel according to an embodiment of the present invention.
Figure 4:
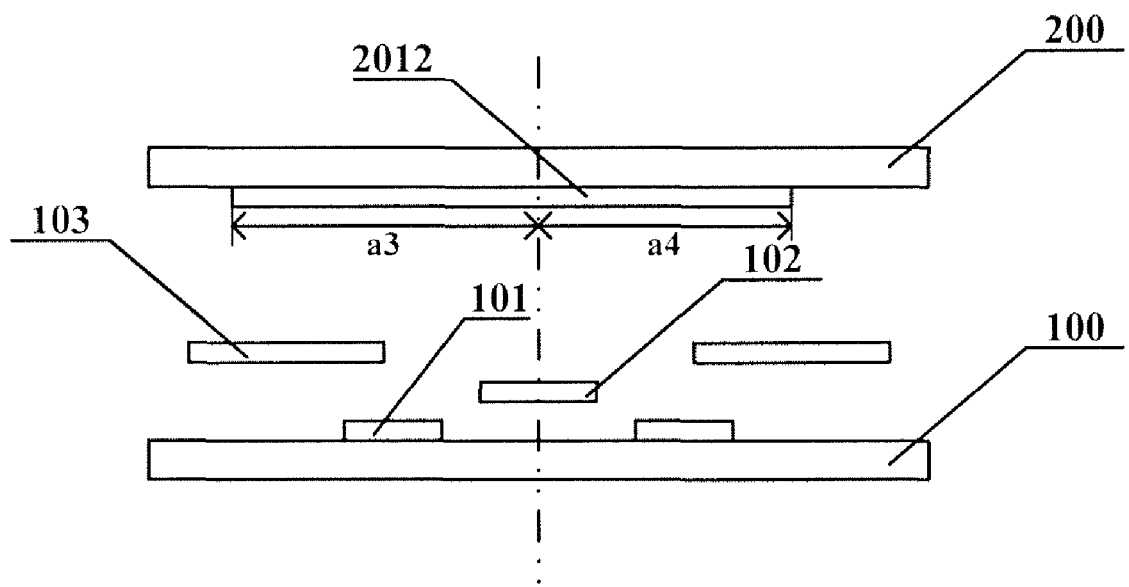
FIG. 4 is a structural view showing a right side region of the LCD panel according to the embodiment of the present invention.

FIG. 3 and FIG. 4 show the structural view of the LCD panel according to the embodiment of the present invention. According to the embodiment of the present invention, the LCD panel comprises an array substrate and a color filter substrate. The array substrate comprises a first substrate 100, on which there are formed shielding bars 101, gate lines (not shown), data lines 102, and pixel electrodes 103. The color filter substrate comprises a second substrate 200. The array substrate and the color filter substrate can be divided into at least a left side region and a right side region for description.

A plurality of first BMs 2011 are provided on the second substrate 200 in the left side region of the color filter substrate, and with respect to a central line of the data line 102 corresponding to each of the first BMs 2011, a length a2 of a right side portion of each of the first BMs 2011 is longer than a length a1 of a left side portion, as shown in FIG. 3. A plurality of second BMs 2012 are provided on the second substrate 200 in the right side region of the color filter substrate, and with respect to a central line of the data line 102 corresponding to each of the second BMs 2012, a length a3 of a left side portion of each of the second BMs 2012 is longer than a length a4 of a right side portion, as shown in FIG. 4.

Furthermore, the length by which the right side portion is longer than the left side portion of each of the first BMs 2011 is set to be equal to that by which the left side portion is longer than the right side portion of each of the second BMs 2012, that is to say, a2−a1=a3−a4=A. The value of A is set in such a way that the decrease of aperture ratio can be minimized. In general, the value A is set in a range of about 2~3 μm.

In the embodiment of the present invention, the first BM 2011 in which the right side portion is longer than the left side portion and the second BM 2012 in which the left side portion is longer than the right side portion are provided respectively in the left side region and right side region on the second substrate 200 of the color filter substrate, so that the assembly margin is increased in side. For example, when the finished LCD panel is flapped from the left side, as shown in FIG. 4, the left side portion of the second BM 2012 is longer than the right side portion and is in a state of extending leftwards, thus the light leakage can be minimized; when the LCD panel is flapped from the right side, as shown in FIG. 3, the right side portion of the first BM 2011 is longer than the left side portion and is in a state of extending rightwards, thus the light leakage can be minimized.

The array substrate and color filter substrate in the LCD panel according to the embodiment of the present invention not only can be divided into two regions of the left and right side regions, but also can be divided into three, four, five or more regions, and the BMs are appropriately designed with respect to each region, so as to minimize the light leakage. From the left side region to the center region of the color filter substrate, the length by which the right side portion is longer than the left side portion for the BM in the center region can be smaller than the length by which the right side portion is longer than the left side portion for the BM in the left side region. From the right side region to the center region of the color filter substrate, the length by which the left side portion is longer than the right side portion for the BM in the center region can be smaller than the length by which the left side portion is longer than the right side portion for the BM in the right side region. Moreover, for the BM in the region near the center region, the left side portion can be set to be equal to the right side portion.

For example, the array substrate and color filter substrate can be divided into four equal regions, which are, sequentially from the left to right, a first region (left side region), a second region (left center region), a third region (right center region), and a fourth region (right side region). For the first BM provided in the first region on the second substrate of the color filter substrate and the third BM provided in the second region on the second substrate of the color filter substrate, the right side portion is longer than the left side portion. For the fourth BM provided in the third region on the second substrate of the color filter substrate and the second BM provided in the fourth region on the second substrate of the color filter substrate, the left side portion is longer than the right side portion. The length by which the right side portion is longer than the left side portion for the third BM is smaller than the length by which the right side portion is longer than the left side portion for the first BM. In a same way, the length by which the left side portion is longer than the right side portion for the fourth BM is smaller than the length by which the left side portion is longer than the right side portion for the second BM. Moreover, for the third and fourth BMs, the left side portion can be set to be equal to the right side portion.

In the LCD panel according to the embodiment of the present invention, the CD of the BM or shielding bar is set to be symmetrical with each other for the corresponding left and right side regions. The decrease of the aperture ratio in the LCD panel according to the present invention can be minimized, as compared with the method in which the lengths of both sides of the BM are increased to increase the critical dimension.

In addition, although the left and right side regions of the LCD panel (comprising the array substrate and color filter substrate) are discussed in the above embodiments, in practice, the upper and lower regions of the LCD panel can be regarded equivalently, that is to say, the upper and lower regions can also be regarded as the left and right side regions in the implementation of the present invention.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A liquid crystal display (LCD) panel, comprising an array substrate and a color filter substrate, the array substrate comprising a first substrate and shielding bars, gate lines, data lines, and pixel electrodes that are formed on the first substrate, and the color filter substrate comprising a second substrate, wherein the array substrate and color filter substrate are divided into at least a left side region and a right side region;

a plurality of first black matrixes (BMs) are provided in the left side region on the second substrate of the color filter substrate, and with respect to a central line of the data line corresponding to each of the first BMs, a length of a right side portion is longer than that of a left side portion for each of the first BMs; wherein an end of the right side portion is closer to an outside edge of a pixel electrode nearest to an end of the right side portion than an end of the left side portion to an outside edge of a pixel electrode nearest to an end of the left side portion; and a plurality of second BMs are provided in the right side region on the second substrate of the color filter substrate, and with respect to a central line of the data line corresponding to each of the second BMs, a length of a left side portion is longer than that of a right side portion for each of the second BMs; wherein an end of the left side portion is closer to an outside edge of a pixel electrode nearest to an end of the left side portion than an end of the right side portion to an outside edge of a pixel electrode nearest to an end of the right side portion.

2. The LCD panel according to claim 1, wherein a length by which the right side portion is longer than the left side portion for each of the first BMs is set to be equal to that by which the left side portion is longer than the right side portion for each of the second BMs.

3. The LCD panel according to claim 1 or 2, wherein the length by which the right side portion is longer than the left side portion for each of the first BMs is about 2~3 μm.

4. The LCD panel according to claim 1 or 2, wherein the length by which the left side portion is longer than the right side portion for each of the second BMs is about 2~3 μm.

5. The LCD panel according to claim 1, wherein the color filter substrate further comprises a left center region and a right center region divided between the left side region and the right side region of the color filter substrate;
    a plurality of third BMs are provided in the left center region on the second substrate, and with respect to a central line of the data line corresponding to each of the third BMs, a length of a right side portion is longer than that of a left side portion for each of the third BMs; and
    a plurality of fourth BMs are provided on the second substrate in the right center region, and with respect to a central line of the data line corresponding to each of the fourth BMs, a length of a left side portion is longer than that of a right side portion for each of the fourth BMs.

6. The LCD panel according to claim 5, wherein a length by which the right side portion is longer than the left side portion for each of the third BMs is smaller than the length by which the right side portion is longer than the left side portion for each of the first BMs; and
    a length by which the left side portion is longer than the right side portion for each of the fourth BMs is smaller than the length by which the left side portion is longer than the right side portion for each of the second BMs.

7. The LCD panel according to claim 1, wherein the color filter substrate further comprises a left center region and a right center region provided between the left side region and the right side region of the color filter substrate;
    a plurality of third BMs are provided on the second substrate in the left center region, each of the third BMs are symmetrical with respect to a central line of the corresponding data line thereof; and
    a plurality of fourth BMs are provided on the second substrate in the right center region, each of the fourth BMs are symmetrical with respect to a central line of the corresponding data line thereof.

\* \* \* \* \*